United States Patent
Feldman et al.

[11] Patent Number: 5,183,386
[45] Date of Patent: Feb. 2, 1993

[54] VERTICAL AXIS SAIL BLADED WIND TURBINE

[76] Inventors: Lewis Feldman, 2000 Valley Forge, Apt. 1233, King of Prussia, Pa. 19406; Michael Concannon, R.R. #1, Port Dufferin, Nova Scotia, Canada, B0J2RO

[21] Appl. No.: 358,423

[22] Filed: May 30, 1989

Related U.S. Application Data

[63] Continuation-in-part of Ser. No. 289,247, Dec. 23, 1988.

[51] Int. Cl.⁵ .............................................. F03D 3/00
[52] U.S. Cl. .................................. 416/119; 416/139; 416/240; 415/4.2
[58] Field of Search .......... 416/88, 99, 132 B, 175 A, 416/142 B, 227 A, 240 A, DIG. 8, 139 A; 415/4.1, 4.2

[56] References Cited

U.S. PATENT DOCUMENTS

| 556,396 | 3/1896 | Auld | 416/142 B |
|---|---|---|---|
| 1,319,174 | 10/1919 | Ochoa | 416/132 B X |
| 3,065,799 | 11/1962 | McCarty | 416/23 |
| 3,188,020 | 6/1965 | Nielsen et al. | 416/88 X |
| 3,597,108 | 8/1971 | Mercer et al. | 416/240 A X |
| 3,633,850 | 1/1972 | Feldman | 416/240 A X |
| 3,918,839 | 11/1975 | Blackwell et al. | 416/227 A X |
| 4,281,965 | 8/1981 | Stjernholm | 416/227 A |
| 4,334,823 | 6/1982 | Sharp | 416/227 A |
| 4,342,539 | 8/1982 | Potter | 416/9 |
| 4,422,825 | 12/1983 | Boswell | 416/227 A X |
| 4,449,053 | 5/1984 | Kutcher | 416/227 A X |
| 4,500,257 | 2/1985 | Sullivan | 416/227 A X |
| 4,624,624 | 11/1986 | Yum | 416/227 A X |
| 4,735,552 | 4/1988 | Watson | 416/99 |

FOREIGN PATENT DOCUMENTS

| 2839918 | 3/1980 | Fed. Rep. of Germany | 416/132 B |
|---|---|---|---|
| 3004669 | 8/1981 | Fed. Rep. of Germany | 416/119 |
| 2298707 | 8/1976 | France | 416/227 A |
| 32076 | 2/1982 | Japan | 416/227 A |
| 207882 | 9/1986 | Japan | 416/88 |
| 7606729 | 12/1977 | Netherlands | 416/132 B |
| 1353926 | 11/1987 | U.S.S.R. | 416/227 A |

Primary Examiner—Edward K. Look
Assistant Examiner—Hoang Nguyen
Attorney, Agent, or Firm—Norman St. Landau

[57] ABSTRACT

A vertical axis turbine is provided which comprises a plurality of flexible sail blades attached to a vertically extending, rotatable shaft by upper and lower blade attachment devices, and a power absorbing load device coupled to the rotatable shaft. The flexible sail blades are deployed and stabilized in operation by the centrifugal forces produced in response to rotation of the blades about the vertical axis of the shaft, whereby, in operation, aerodynamic forces acting on the sail blades can be transmitted to shaft without generating bending movements. The sail blades comprise plural elongate flexible sail panels, with flyweights being disposed between and secured to the ends of pairs of the sail panels. In different embodiments, passive flyweights, active flyweights (secondary turbines) and combinations of both types are used.

13 Claims, 9 Drawing Sheets

5,183,386

VERTICAL AXIS SAIL BLADED WIND TURBINE

CROSS REFERENCE TO RELATED APPLICATIONS

This application is a continuation-in-part of my co-pending application, U.S. Ser. No. 07/289,247 filed on Dec. 23, 1988.

FIELD OF THE INVENTION

The present invention relates to vertical axis wind turbines and, more particularly, to improved wind turbines having sails for blades wherein the blades are deployed and stabilized by the centrifugal forces acting on flyweights attached to the ends of the panels comprising the sails.

BACKGROUND OF THE INVENTION

Wind turbines are an ancient means of extracting the force, in the sense of being fuelless, energy of the wind. They have had a long and successful history of contributing to such tasks as pumping water and milling grain, tasks which could be done intermittently whenever the wind was available to do the work. With the pressure of competition from the internal combustion engine and its cheap power, the wind turbine went into decline in that part of the world economy which either had oil or could afford to import it. By the time of the "oil crisis" of 1973 wind turbines had been driven even from their historic role in the pumping of the Dutch polders.

With the disruptions of the oil supply in 1973, realizations arose that fossil fuels would sooner or later become scarce and expensive. As they did, the price of these fuels would rise and their quality, especially their cleanliness, would fall. Furthermore, economies dependent upon imported fuels would be increasingly at the mercy of fewer and fewer suppliers. With these realizations many of the industrialized nations tried to find alternative sources of energy. The main result of these programs was to discover how difficult it was to find such sources which could compete economically with oil. Of the competing alternates, wind energy appears to have come closest to success. In addition to economic factors, it has the further attributes of being free of chemical pollution and the "greenhouse" effect.

The difficulty faced by existing wind-turbines is that their cost of operation, which is almost entirely the cost of the capital to build them, is too high. The principal reason for this difficulty is that the airloads are carried to the output through inefficient bending structures. In addition to the excessive cost and weight of these primary structures, several significant consequences flow from this fundamental characteristic. Economies of large scale cannot be realized because, after reaching some critical size, the cost of the rotating components of wind turbines increases with size at a rate disproportionate to the value of the energy they produce. While this is true for all turbine systems, it is doubly important in the wind energy area because large scale turbines, by reaching higher into the available wind, would capture much more energy from a given site thereby increasing their role in the energy economy. A further obstacle to large size wind-turbines has been the large torques they produce which must be transmitted through heavy and expensive drive components. To avoid these large torques, previous workers in the field have tried to mount secondary turbines on the tips of the blades of their machines. These secondary turbines would absorb the torque produced by the primary turbine and convert it into mechanical energy at high rotational speeds and correspondingly low torques. These attempts have been unsuccessful because of the structural systems required to support these tip turbines were not cost effective.

Wind turbines would profit from the ability to operate at high rotational and tip speeds. This would have several favorable effects: such turbines would, in principle, have blades with narrower chords and hence weigh and cost less; and the higher rotational speed would produce the same power at lower torque lowering the cost and weight of the driveshaft, couplings, gearbox and other components of the drive system. Conventional structural systems have, more or less, reached the point where further increases in the tip speed would result, for reasons of strength, in such substantial increases in the blade thickness as to cause losses in aerodynamic efficiency outweighing any gains.

Conventional vertical axis wind-turbines have rigid blades and must, perforce, use essentially symmetrical airfoils thus losing the advantages of the more efficient cambered airfoils. The blades of present wind turbines require considerable tooling for economic manufacture. As a result, it is prohibitively expensive to customize blades and turbines to each users site. Turbine and blade designs are compromised to average conditions and non-average installations suffer needless performance losses. Turning to specific examples of the prior art, the leading example of state-of-the-art vertical axis wind turbine technology is the Darrieus turbine named for its inventor G. J. M. Darrieus, who applied for French patents on his machines in 1925 and 1926 and for U.S. Pat. No. 1,835,018. A contemporary design of a Darrieus machine is described in the Sandia National Laboratories Report "Design and Fabrication of a Low Cost Darrieus Vertical Axis Wind Turbine System, Phase II, Volume 2. Final Technical Report" SAND82-7113/2 and related documents. This form of machine, which simplified wind turbine design and construction considerably by eliminating yaw and pitch controls, became the paradigm of the vertical axis wind turbine but is still too expensive to compete unaided against oil. Blades formed into the shape of a "Troposkein" distinguish the Darrieus machine. This shape substantially eliminates the bending moments due to the inertial forces of the rotating blade and carries those loads in tension.

Important disadvantages of the Darrieus turbine include the fact that, since the turbine has curved blades, the blades are expensive to manufacture and are not amenable to variable geometry. As a consequence the Darrieus machine has no aerodynamic control and hence must be designed for unnecessarily high loads. In addition, the expense of the individual blades requires turbines with few, usually two, blades thus precluding the benefits which flow from the smoother operation of several blades. Furthermore the Darrieus rotor is limited to symmetric airfoil sections and loses performance thereby in two ways: it is unable to profit from the superior aerodynamic efficiency of cambered airfoil sections and it is needlessly inefficient in the important neighborhood of zero angle of attack.

The special "troposkein" shape of the rigid Darrieus blades eliminates bending due to the centrifugal loads but leaves the weight and airloads unaffected. Therefore, the blades of the Darrieus machine carry the primary airloads in bending and these loads go through an alternation in sign every revolution, a severe fatigue burden. Furthermore, as the size of the blades increases, the weight loads become a dominant and limiting feature of these and all other rigid blade machines. Too, the rigid blade structure of the Darrieus machine is not amenable to carrying secondary, tip turbines because of the large weight moments such turbines would generate.

Vertical axis machines of the "Savonius" type, i.e. drag driven machines, have intrinsically low efficiencies which various workers have tried to improve. U.S. Pat. No. 4,359,311 (Benesh) teaches the use of a new, rigid bucket shape to improve the aerodynamic efficiency of his Savonius-like machine. U.S. Pat. No. 4,496,283 (Kodric) provides a mechanical means for varying the geometry of a Savonius machine. As mentioned above and discussed below, the present invention involves the use of sail blades and it is noted that the reference in the Kodric patent to sailboats is gratuitous. U.S. Pat. No. 4,156,580 (Pohl) teaches another version of the Savonius machine with rigid blades. None of these teachings deal with actual sail blades.

Others have tried to provide control for lift-driven vertical axis machines. A leading example is U.S. Pat. No. 4,087,202 (Musgrove) which, for example, provides a straight, rigid bladed configuration with variable geometry for control through a complex linkage which must engender unnecessary aerodynamic losses in addition to added costs, maintenance and complexity. This line of attack has also been pursued in U.S. Pat. No. 4,105,363 (Loth) and in U.S. Pat. No. 4,334,823 (Sharp).

The word "sail" was formerly the generic name for what are now termed the "blades". This nomenclature appears in many patent references which show rigid metal structures but refer to them as "sails". An example of this usage is contained in U.S. Pat. No. 4,245,958 (Ewers).

Some patents teach the use of semi-rigid blades. U.S. Pat. No. 4,355,956 (Ringrose et al) teaches the use of a semi-rigid sail fastened along its leading edge to a rigid spar. U.S. Pat. No. 4,561,826 (Taylor) teaches the use of a blade which is elastically supple along its span. Neither of these machines uses a flexible membrane which characterizes a true sail. A particular form of a semi-rigid sail is the "Princeton Sail" advocated by Sweeney and employed in U.S. Pat. No. 4,433,544 (Wells et al) and disclosed by Ahmadi in Wind Engineering Vol. 2, No. 2, 1978. This sail has a spanwise, rigid, leading edge member about which a double membrane is wrapped. The trailing edge is supported by fine cable. Ahmadi reports his maximum efficiency, i.e. power coefficient, to be 0.008. This, about 1/50 of that of other machines, is too small to be of any use.

Heretofore, vertical axis wind turbines with sail-like blades have had radial beams carrying spars or circular or polygonal frames from which the blades were supported. These configurations were used long ago in China and Iran and one such turbine is in current use in Sweden to drive a carrousel in a children's park.

A photograph of an ancient Iranian turbine of this type is shown in Ahmadi above. A very good example of a Chinese machine of this type is shown in Plate I of the well known book "Generation of Electricity by Wind Power" by E. W. Golding. Such a machine is taught in U.S. Pat. No. 4,052,134 (Rumsey) which shows sailboats with conventionally deployed sails sailing in an annular trough. U.S. Pat. No. 4,342,539 (Potter) shows square sails strung on booms with a telescoping mast. U.S. Pat. Nos. 4,545,729 (Storm) and 4,619,585 (Storm) teach the use of sails mounted on a rotating frame with roller reefing gear to vary the amount of sail deployed and a deformable mechanism to provide variable camber. These constructions gain only a fraction of the advantages of structural efficiency and variable geometry that sail blades can provide and that only at the expense of disadvantages in cost, weight and complexity of the rigid structures and mechanisms required to support them and the aerodynamic inefficiencies that they inevitably entail.

Most operators of wind-turbine installations would welcome systems which are simple, efficient in their conversion of wind energy, inexpensive to build and operate, adaptable to their individual sites, capable of capturing the maximum amount of energy available at their sites, and available in sizes large enough to take full advantage of their sites and are readily controllable.

SUMMARY OF THE INVENTION

In accordance with the invention, a variable geometry vertical axis wind-turbine is provided which uses structurally efficient sail blades that are deployed and stabilized without the usual lattice or spar supports. From this basic structural system flow a broad range of important economic advantages both in cost and in energy capture. For example, the efficient structure minimizes the loads to be borne by the blades thereby saving weight and cost. Further, the low cost blade structure enables the economic use of a higher number of blades resulting in a smoother running machine with lower ripple loads thus further increasing the structural efficiency and also reducing fatigue effects. These low cost sail blades will be made of well developed materials and processes using a minimum of tooling and machinery.

By avoiding bending moments at the inception, the use of low solidity blading is made economic thereby increasing the operating tip speeds, reducing the torque loads throughout the drive system and reducing the gear ratio of the speed increaser.

The variable geometry of the turbine of the invention provides for the limiting of load at high wind speeds thus providing for rating the machine at its economically optimum rating and avoiding wasteful over-rating of components as is the present practice.

Because of the intrinsically lighter and less expensive blade structure of the machine of the invention, the weight and cost growth with size is less rapid than with conventional turbines. Hence the most economic size of the turbine of the invention is increased substantially over that of conventional turbines and greater gains in the economies of large scale can be achieved.

Furthermore, the efficiency of the basic structure of the invention provides for the efficient carriage of secondary turbines. This capability is a breakthrough in the size and economy of wind turbines since very large turbines could be efficiently used without the large increases in torque loads and drive costs that would be encountered with conventional machines.

In addition to the above advantages in lower cost provided by the invention, there are further advantages in energy capture. Specifically, the invention provides for blades which are automatically cambered to provide higher aerodynamic efficiency thus increasing energy capture. The invention further provides for the variation of turbine capture area with wind speed so that more energy can be extracted from the frequent low wind speeds than conventional machines can without overloading the machine at high wind speeds. Because of the simple tooling required, blades can economically be tailor made for any specific wind site so as to extract the maximum amount of the available energy.

The invention also increases the market for wind turbines by making viable low wind sites presently uneconomic.

Other features and advantages of the invention will be set forth in, or apparent from, the detailed description of preferred embodiments of the invention which follows.

DESCRIPTION OF THE PREFERRED EMBODIMENTS

Figure 1:
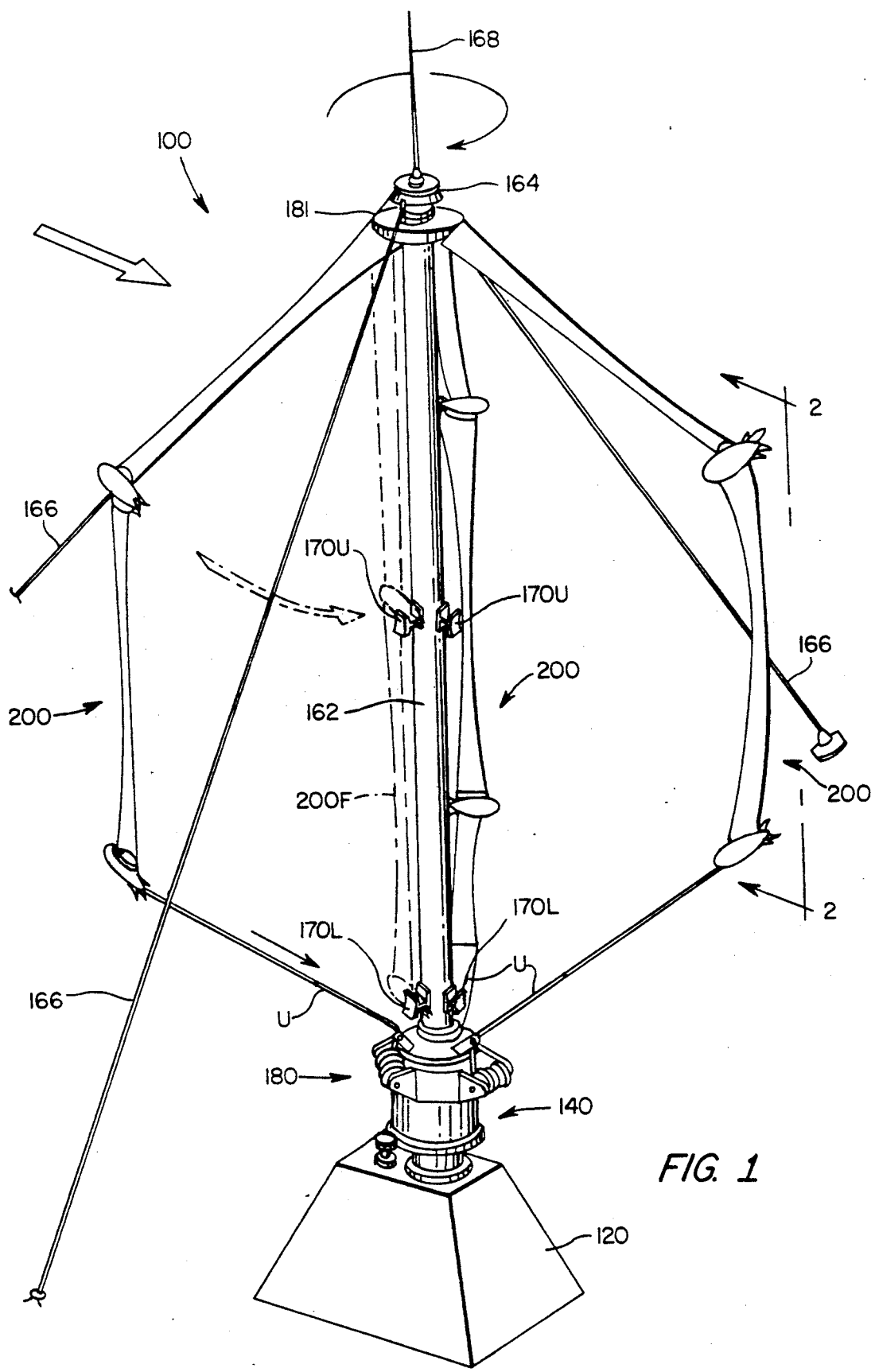
FIG. 1 is a perspective view of one preferred embodiment of the invention which includes three blades, three panels per blade and two passive flyweights.
Figure 2:
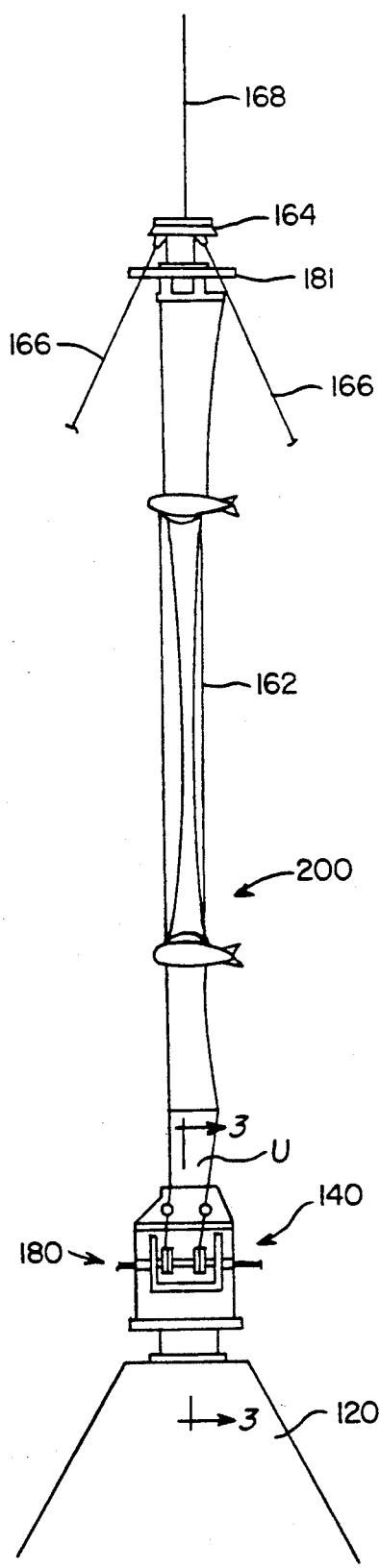
FIG. 2 is a fragmentary side elevation view of the embodiment shown in FIG. 1 taken in the direction 2—2.

FIGS. 1 and 2 show a first preferred embodiment of a vertical axis sail turbine, generally denoted 100, having three blade assemblies 200 each of which has three panels and two passive flyweights 220. The wind direction is indicated by the broad arrow coming as substantially from the left. The turbine rotates in a clockwise direction when viewed from above.

Figure 3:
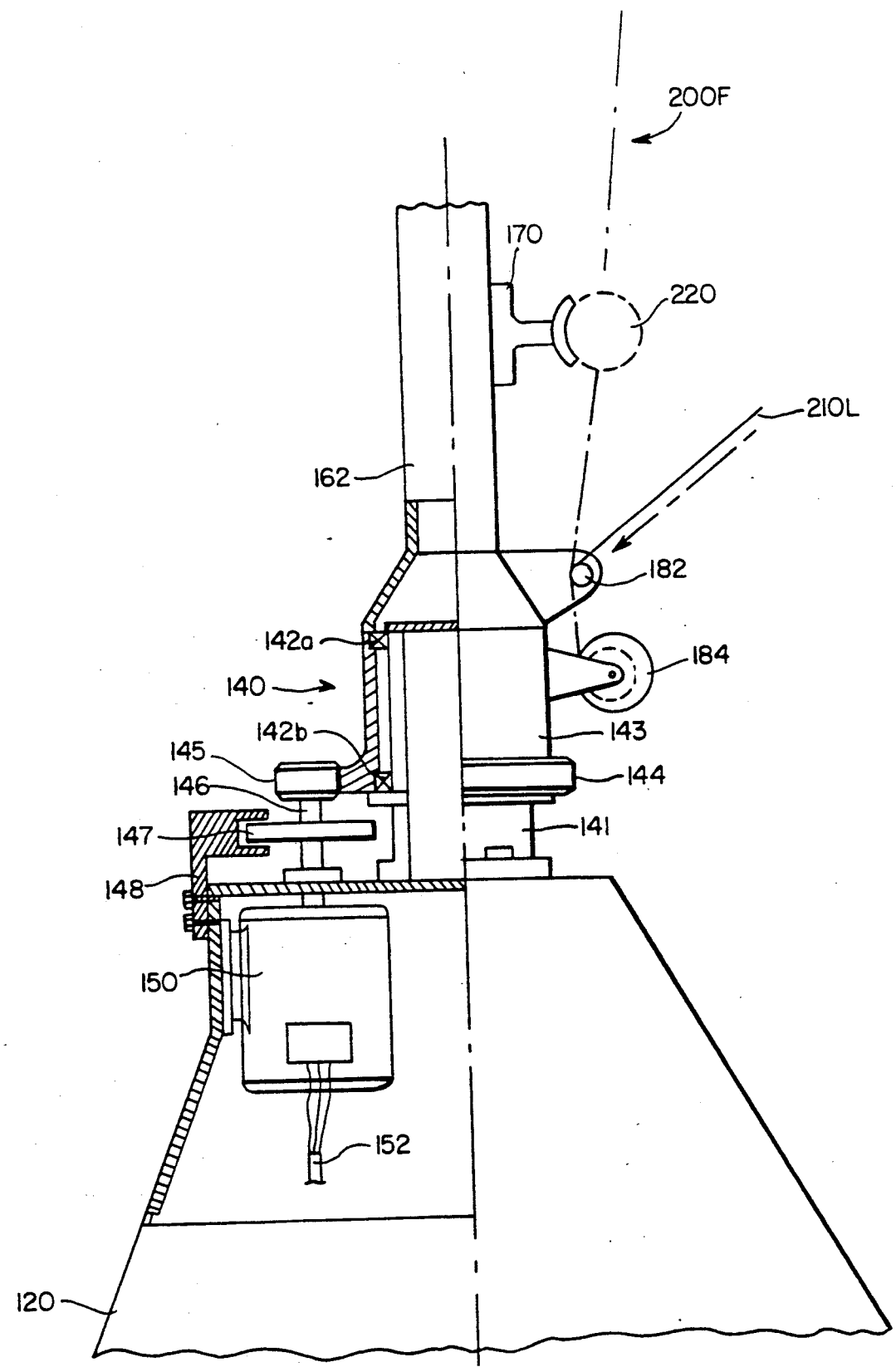
FIG. 3 is a partial cross-sectional view taken approximately along line 3—3 of FIG. 2.

Turning first to the speed increaser assembly, which is generally denoted 140, the turbine 100 is set upon a base 120 which supports the speed increaser assembly 140, the details of which are shown in FIG. 3. A drive shaft 162, which also serves as the turbine mast, is the input shaft of the speed increaser 140 through a housing 143. A bull gear 144, attached to the housing 143, engages a pinion 145 which drives a high speed shaft 146 and which is connected to an electric generator 150. This electric generator 150 also serves as the starting motor as will be explained below. Mounted on a high speed shaft 146 is a brake disk 147 cooperating with a brake caliper 148 which is mounted on the base 120. A stationary stub shaft 141 supports the housing 143 and hence the drive shaft 162 through a set of bearings 142a and 142b. The housing 143 also supports, for each of the blades, an idler shaft 182 and a hub reel 184 disposed at appropriate positions along its periphery.

A drive assembly 160 is comprised of the drive shaft 162, which, as discussed above, is attached to the speed increaser 140 at its lower end and is supported at its upper end in an upper bearing assembly 164. The latter is positioned and supported by the set of guys 166. This method of supporting the rotating shafts of vertical axis wind turbines is well advanced. (See, for example, the Sandia documents referenced above.) At the top of the drive assembly is a lightning rod 168. At the proper elevation along the drive shaft 162, as indicated by the phantom arrow in FIG. 1, there are attached three upper flyweight cradles 170U, one for each blade appropriately disposed around the shaft perimeter. Similarly, at the appropriate elevation near the bottom of the shaft there are three lower flyweight cradles 170L. Near the top of the shaft 162, but beneath the upper bearing assembly 164, the fixed upper hub or blade attachment means, denoted 181, is fixed to the shaft 162.

Figure 4:
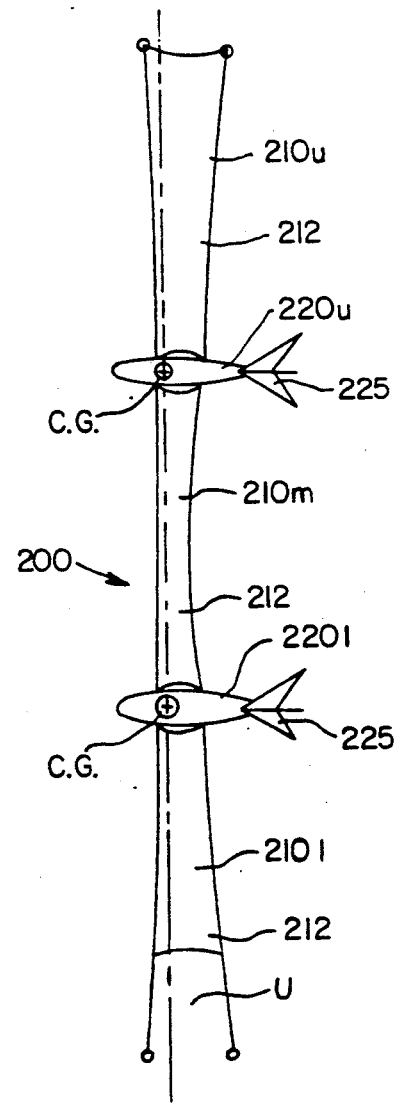
FIG. 4 is detail of FIG. 2 showing one blade assembly.
Figure 5:
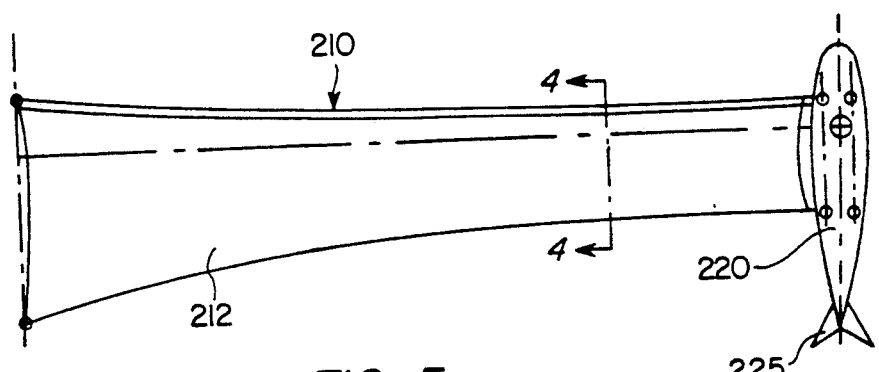
FIG. 5 is a detail of FIG. 4 showing one panel assembly.
Figure 6:
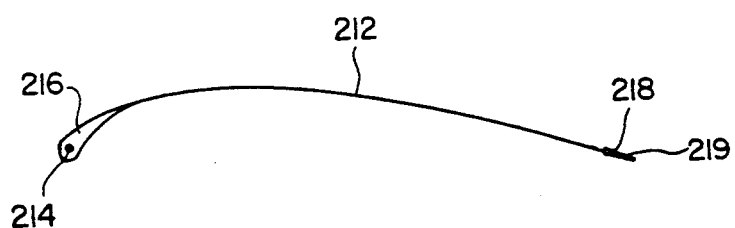
FIG. 6 is a cross-section of FIG. 5 taken in the direction of line 4—4.

Each of the blade assemblies 200, one of which is shown in some detail in FIGS. 4, 5 and 6, consists of three panels or panel assemblies, viz., an upper panel 210U, a middle panel 210M and a lower panel 210L. The phantom lines in FIG. 1 show the blade assemblies 200 in the furled position 200F. The upper blade panels 210U ar attached to the drive shaft 162 by means of their end fittings through the fixed upper hub 181. The lower ends of the upper blade panels 210U are attached to the upper flyweights 220U. The middle blade panels 210M are attached at their upper end to their respective upper flyweights 220U and at their lower end to their respective lower flyweights 220L. The lower blade panels 210L are attached to their respective lower flyweights 220L at their upper ends and are attached to their respective hub reels 184 at their lower ends. To simplify reeling, the lower panels may be partially unclothed as indicated at U in FIG. 4.

A typical panel assembly, which is generally denoted 210, is shown in FIG. 5 and FIG. 6. Each panel consists of an appropriately shaped membrane 212 made of woven or non-woven fabric, or a plastic film or other suitable material. The leading and trailing edges of the membrane 212 are concave as shown. Attached to the leading edge of the membrane 212 is a leading edge strength member 214 made up of flexible cable of suitable material such as a wire or fabric rope, or a parallel laid cable, terminating at both ends in a fitting, such as a clevis, suitable for attaching this member to others as required. The leading edge strength member 214 is enclosed in a suitably shaped aerodynamic fairing 216, blunt at the leading edge and tapering smoothly into the membrane and is attached to the leading edge as shown. This fairing 216 is composed of a pliable material such as a natural or synthetic elastomer. A trailing edge strength member 218, which will generally be considerably smaller than the leading edge strength member, is attached to the trailing edge of the membrane 212 and may be enclosed in suitable trailing edge fairing 219. The leading and trailing edge members 214 and 218 take on the concave shape of the membrane edges to which they have been attached. The passive flyweight 220 is made of any suitable material and shaped into a streamlined form as shown. Flyweight 220 includes suitable mounting points so that the leading and trailing edge strength members can be attached by means of their end fittings. The flyweights 220 are positioned on the chord of the panel so that their centers of gravity C.G. are located less than 25% the distance between the leading and trailing edges aft of the leading edge attachment. The curvatures of the leading edges of the panels will be correspondingly less than that of the trailing edges of the panels.

Figure 7:
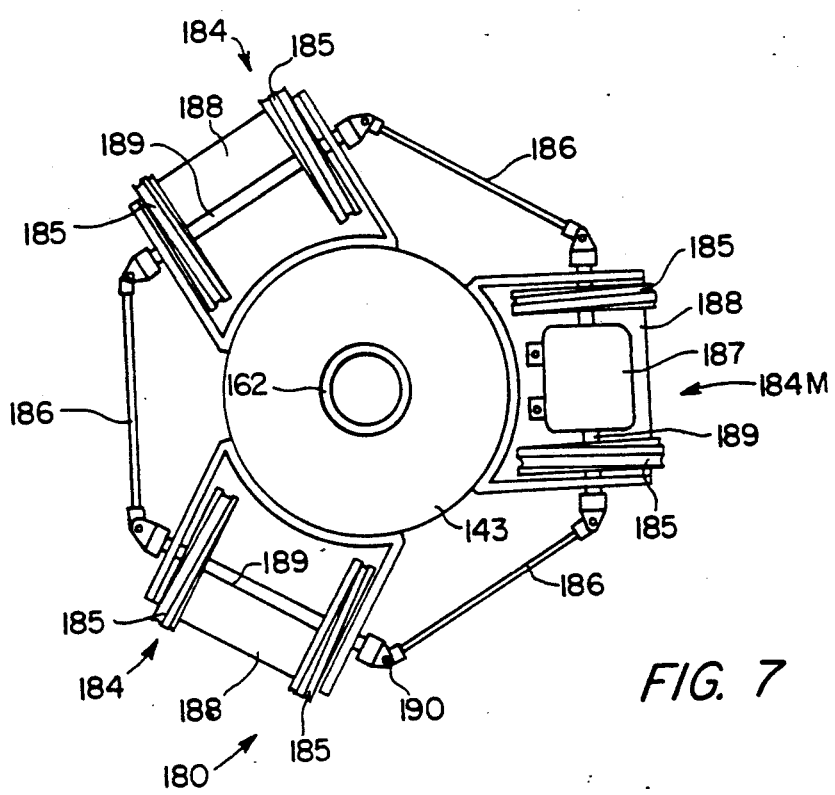
FIG. 7 is a simplified cross-section of FIG. 2 in the direction of line 5—5.

Referring to FIG. 7, which is a simplified cross-section of FIG. 2 taken in the direction 3—3, a control hub assembly 180 of the reel type is shown. In this embodiment, reels 184, one for each blade, are conveniently mounted on the housing 143 of the speed increaser 140. Each reel 184 comprises a bracket 188 supporting a reel shaft 189 on which are mounted grooved drums 185. A master reel 184M is motor driven by a reel motor 187 and is connected to the other reels by synchronizing shafts 186 and universal joints 190 so that all blades are deployed and furled in synchronism.

Figures 8, 9:
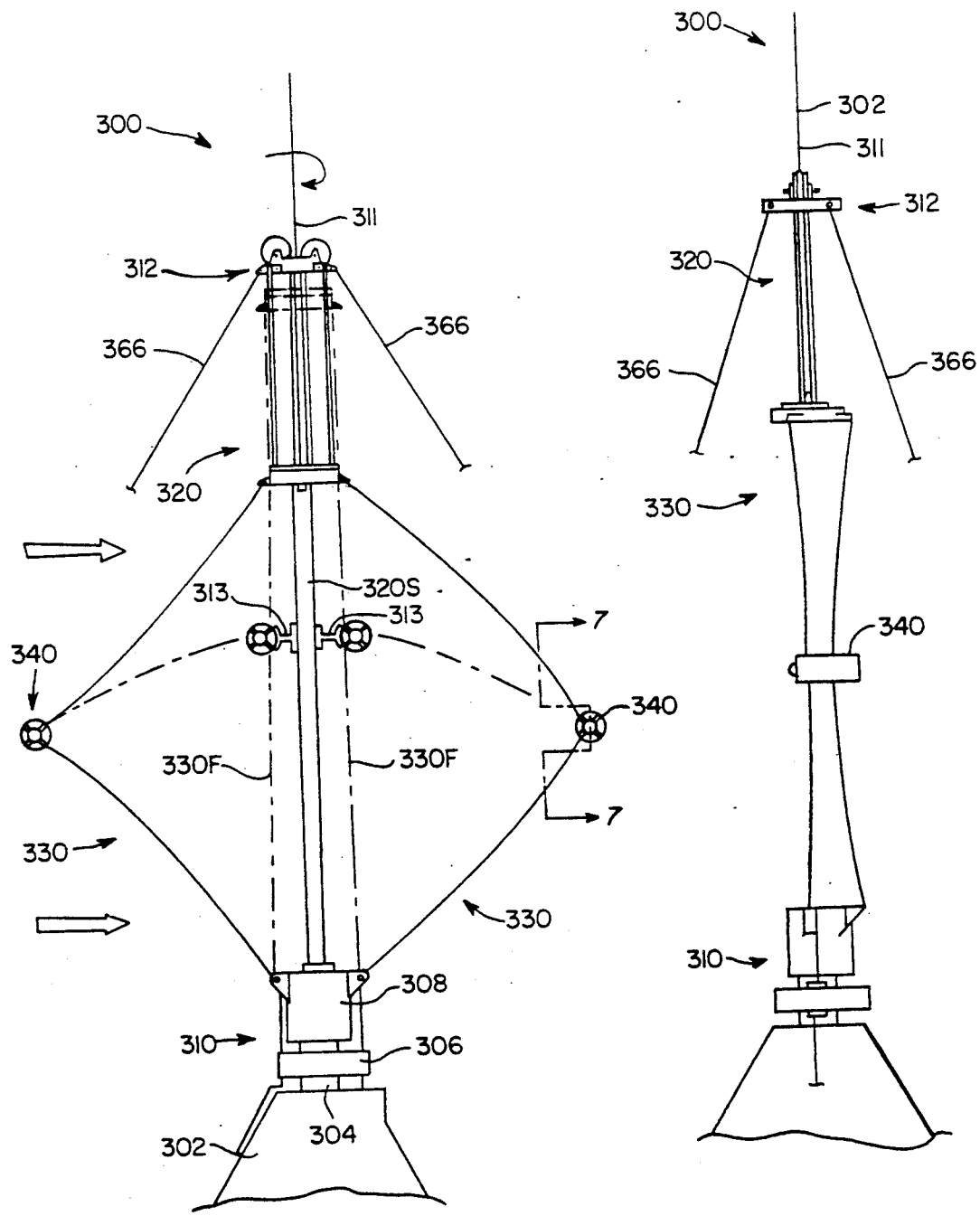
FIG. 8 is a front elevation of a second preferred embodiment.
FIG. 9 is a fragmentary side elevation of this second preferred embodiment.

A second preferred embodiment of the invention is shown in FIG. 8 and FIG. 9. In this embodiment, the wind turbine, which is generally denoted 300, has two blade assemblies 330 each having two panels and carrying an active flyweight assembly 340 in place of the passive flyweights in the previous embodiment. As will be evident from the description below, the use of secondary turbines of the active flyweight assemblies 340 eliminates the need for the mast to act as a drive shaft and replaces the one large speed increaser with a small gearbox in each active flyweight. As is also discussed below, the blade control of this embodiment is a sliding hub which replaces the reel hub of the first preferred embodiment.

Turning first to the spindle assembly, which is generally denoted 320, a base 302 supports a stub shaft 304 which carries a bearing set (not shown) similar to that described above which supports a housing 308 which is free to rotate about the stub shaft 304. A slip-ring assembly 306 is mounted on the stub shaft 304. On the housing 308 there are mounted attachment ears 315 to which leading edge strength members 332 and trailing edge strength members 334 of lower blade panels 331L are attached. The lower end of the spindle shaft 320S is mounted on the rotable housing 308. At the appropriate positions on the shaft, one cradle 313 for each blade is attached to receive the active flyweight assemblies 340 in their retracted positions. The upper end of the spindle shaft 320S is supported in the upper bearing assembly 312 which is stayed in position by three guys 366 spaced uniformly around the upper bearing assembly 312 much as in the previous embodiment described above. An antenna 311 is attached to the top of upper bearing 312.

Considering the sail blade assemblies 330, the upper panels 331U of the blades are attached ears 326 of to a sliding control hub 324 in a manner similar to that described above. The sliding control hub 324 has spline sockets to engage splines 322 on the spindle shaft 320S so as to permit sliding motion of the hub 324 along the spindle shaft 320S but to prevent rotation of said hub with respect to the spindle shaft 320S. Control cables 328 are attached to the sliding control hub 324. The control cables 328 run over pulleys 329, which are attached to the top of the hollow spindle shaft 320S, and then continue down into the interior of spindle shaft 320S where these cables are attached to the drum of a cable drive system. The art of reeling cables is well developed and the cable reeling arrangement will not be described further here.

Figure 12:
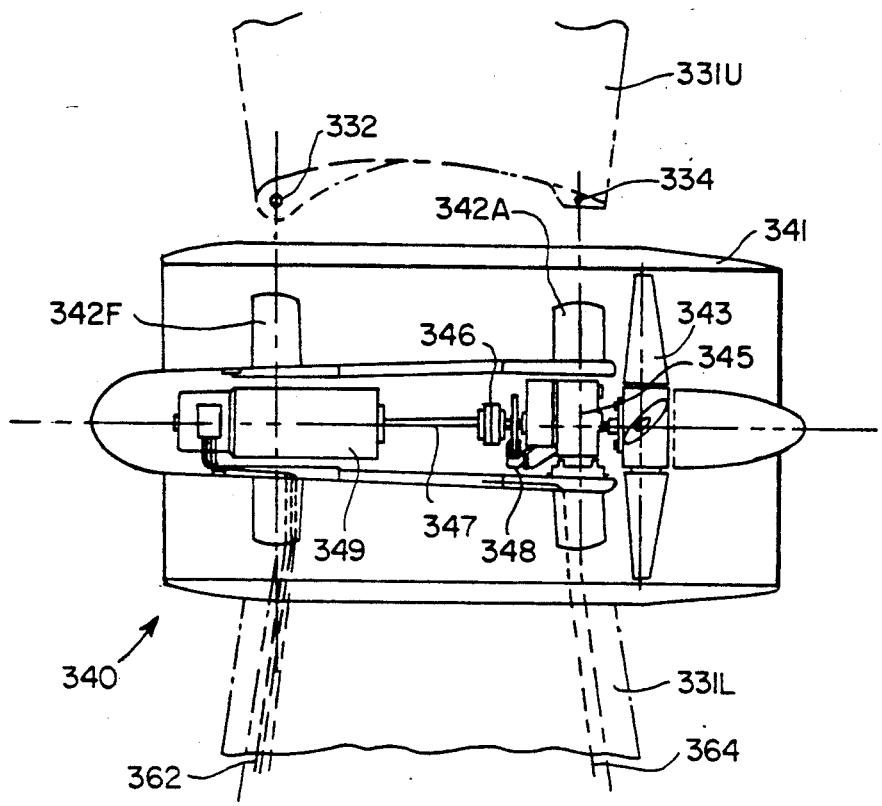
FIG. 12 is a sectional view of the active flyweight assembly along the line 7—7 of FIG. 8.
Figure 13:
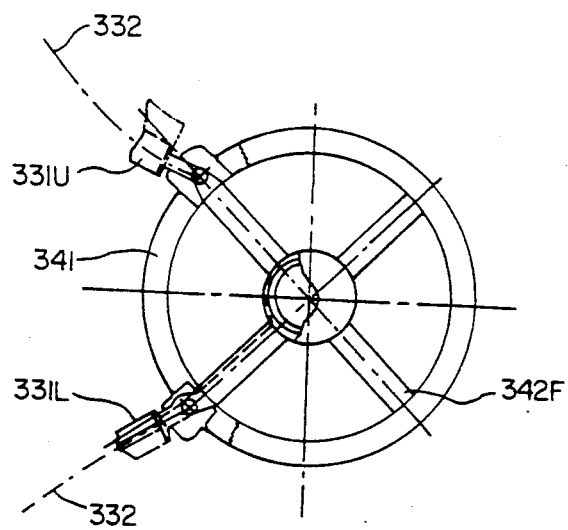
FIG. 13 is a front elevation view of the active flyweight assembly.
Figure 14:
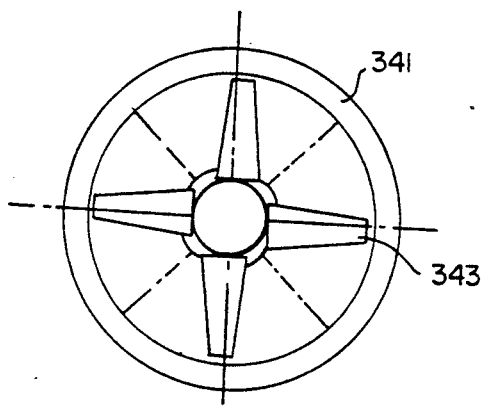
FIG. 14 is a rear elevation view of the active flyweight assembly.

Turning now to the active flyweight assemblies 340 which are shown in FIGS. 12, 13 and 14, the lower ends of upper blade panels 331U and the upper ends of lower blade panels 331L of each assembly are attached to spiders 342 of the active flyweight assembly 340 as shown in FIG. 13. Mounted on the spiders is a cowling 341. The secondary turbine 343 of the active flyweight assembly 340 is coupled to a gearbox 345 which acts as a speed increaser. The gearbox 345 is mounted on an aft spider 342A. The output shaft of the gearbox carries the disk of the brake 348 and is coupled to a high speed generator shaft 347 through a coupling 346. A generator/motor 349 is mounted on a forward spider 342F. Methods for mounting turbines, gearboxes and rotating loads in cowlings is well known in the aircraft propulsion field and will not be described further here.

Figure 10:
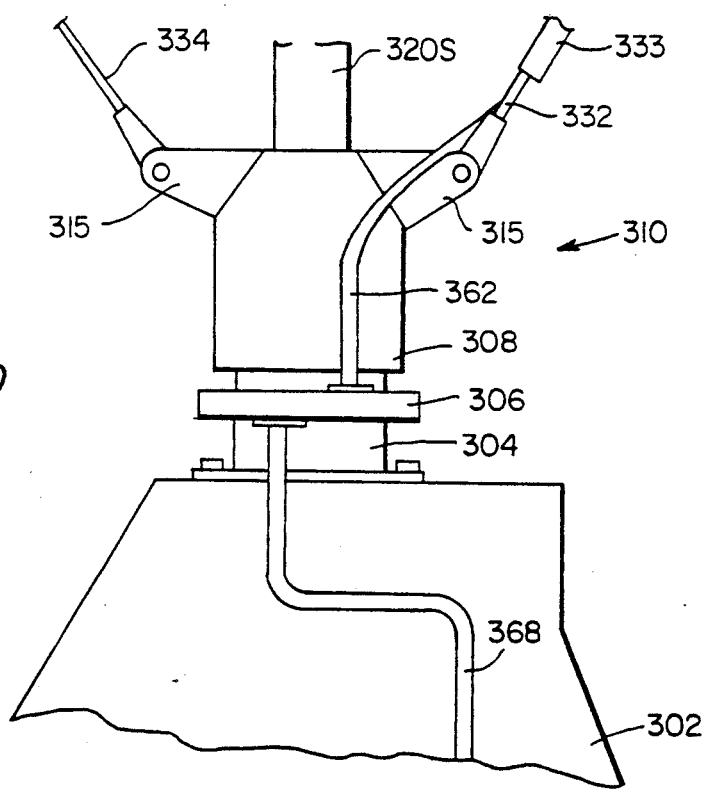
FIG. 10 is a partial front elevation showing simplified details of the lower portion of the second preferred embodiment.

The configuration shown has the secondary turbine 343 aft of the generator 349. This arrangement simplifies the mechanical problem of getting the center of gravity of the active flyweight 340 at the desired location, at the expense of some loss in aerodynamic efficiency. In other embodiments the arrangements can be reversed to get better aerodynamic efficiency and accept the mechanical difficulties needed to get the proper location of the center of gravity. Rotating electrical output cables 362, which rotate with the blades, are led through the forward spider arms 342F into leading edge fairings 333 of the corresponding lower blade panels 331L and then down to the lower ends of the lower blade panels 331L where they leave the blade and are connected to the input brushes of a slip ring assembly 306. Stationary output cables 368 are connected to the output brushes of the slip ring assembly and leave the turbine to be connected to the electrical load, as shown in FIG. 10. For Simplicity, the ground cable is not shown.

Figure 15B:
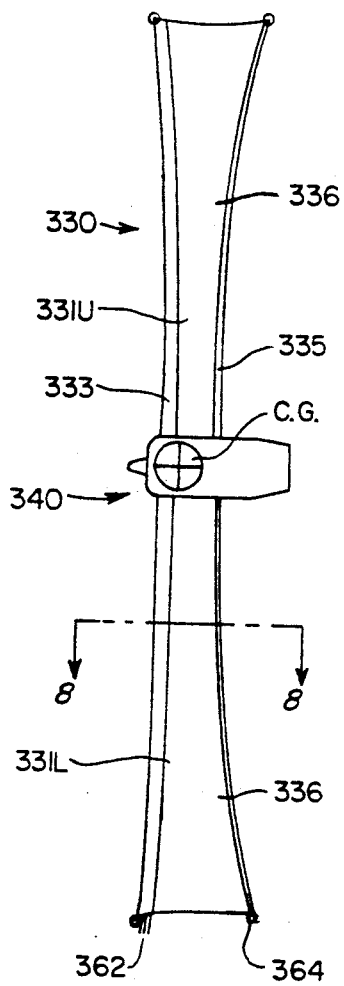
FIG. 15B is a partial detail of FIG. 9 showing one blade assembly.

Referring to FIG. 15B, the two blade assemblies 330 are basically the same as the previously described blade assemblies 200 except that they comprise two panels, denoted 331U and 331L, per blade attached to one active flyweight 340, as shown in FIG. 15B. The leading edge fairing 333 of the lower panel 331L contains the rotating electrical output cables 362. The trailing edge fairing 335 contains the rotating electrical ground cable 364.

Figure 11A:
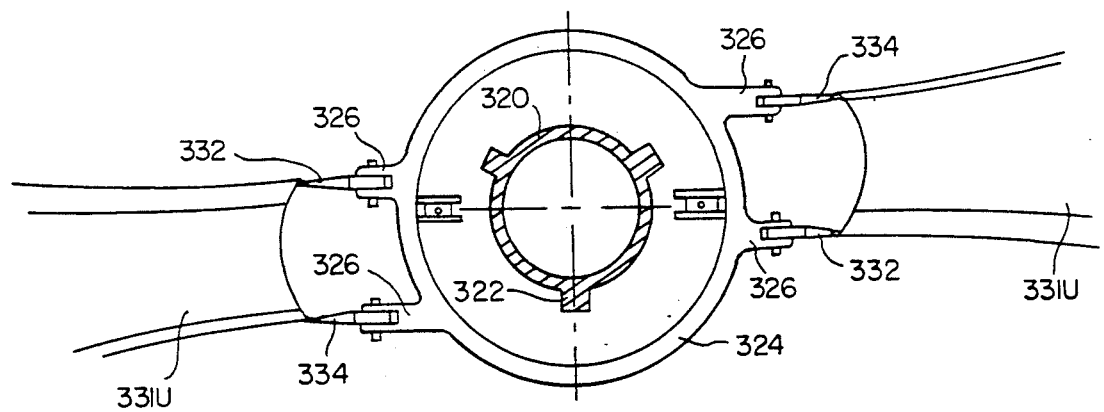
FIG. 11A is a partial section of FIG. 11 along line 6—6.
Figure 11B:
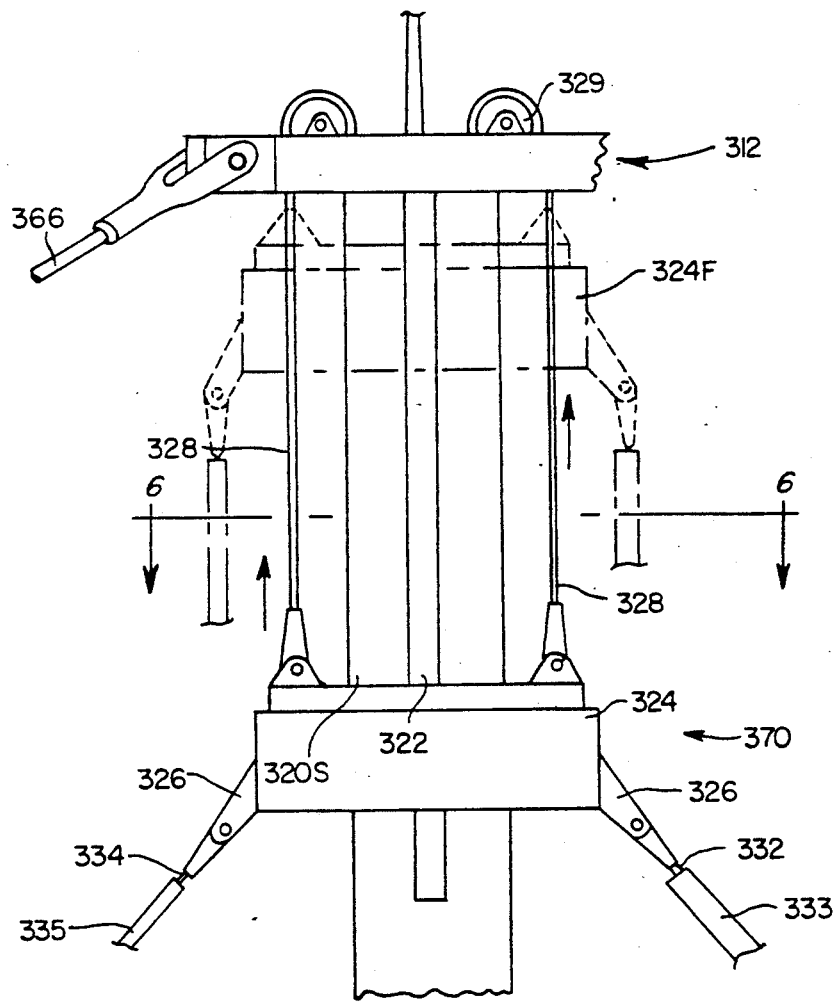
FIG. 11B is a partial front elevation showing simplified details of the upper portion of FIG. 8.

A sliding control hub assembly, denoted 324, is best seen in FIGS. 11B and 11A. The sliding control hub 324 is engaged in sliding engagement with the spindle shaft 320S by splines 322 and cooperating spline sockets in the hub. The terminations of the upper blade leading edge strength members 332 and trailing edge strength members 334 are connected to their corresponding ear attachments 326 which are integral with the sliding hub 324. The control cables 328 are connected to the sliding control hub 324 and run over the control pulleys 329 and down into the hollow drive shaft 320S and to a cable reel control system (not shown).

Figure 17:
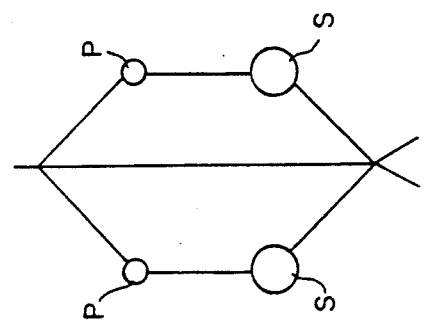
FIG. 17 is a schematic representation of an embodiment having three panels per blade and incorporating both passive flyweights and active flyweights.
Figure 18:
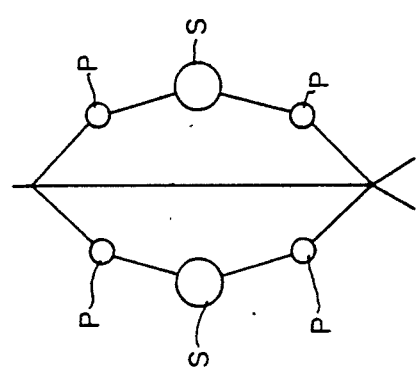
FIG. 18 is a schematic representation of an embodiment having four panels per blade and incorporating both passive flyweights and active flyweights.

The two preferred embodiments discussed in detail above incorporate several elements which can be associated in a wide variety of other embodiments to suit the needs of particular installations. For example, the reel hub described in connection with the first embodiment can be used in place of the sliding hub in an embodiment employing two blades or active flyweights described in the second embodiment. Embodiments using three blade panels can have five blades rather than the three shown. Further, FIG. 17 illustrates schematically a three paneled configuration having active flyweights with secondary turbines S as the lower flyweights and passive flyweights P for the upper flyweights. Such an embodiment economizes the use of secondary turbines without foregoing the large capture area of a three panel blade. FIG. 18 is an embodiment having four panels per blade where the upper and lower flyweights P are passive and the central flyweight S is an active flyweight. This embodiment increases the capture area above that of the previous embodiment at some increase in complexity and cost. It will be appreciated that there are many other combinations of components which can be arranged into other embodiments as needed.

Considering the operation of the first preferred embodiment, when the turbine 100 is idle, the blades are in the furled position denoted by the dashed lines 200F in FIG. 1, lying roughly parallel to the shaft with the flyweights 220 in their cradles 170. When wind speeds are determined to be sufficient to start operations, remote electrical controls are used to energize the electric generator 150 and start it operating as a motor turning the high speed shaft 146. The pinion 145 mounted on the high speed shaft 146 turns the bull gear 144 with which it is engaged. The drive shaft 162 is connected to the bull gear 144 through the housing 143, and rotates with said bull gear 144. The flyweights 220 which are in their cradles 170 rotate with the drive shaft 162. The centrifugal forces developed on the flyweights 220 as a result of this rotation tense the leading and trailing edge strength members 214 and 218 attached to them and tend to deploy the blades 200 but are restrained by their reel hubs 184. The blades are deployed by controlled actuation of the hub control motor 187 which pays out the leading edge strength member 214 and the trailing edge strength member 218 at the desired rate and in unison. At a certain point in their deployment, depending on the wind speed, the blades produce sufficient torque to overcome the friction in the system and produce net power. At this point, the electric generator/motor 150 is driven by the turbine and operates as a generator. The blade deployment continues until the blades are deployed to the required diameter. The tensions in the panel leading edge strength members 214 and trailing edge strength members 218 tend to straighten these members and thereby induce chordwise tensions in the membrane 212. The combined effects of the tension field in the membrane and the centrifugal and aerodynamic pressures determine the shape the sail blades assume.

Figure 16:
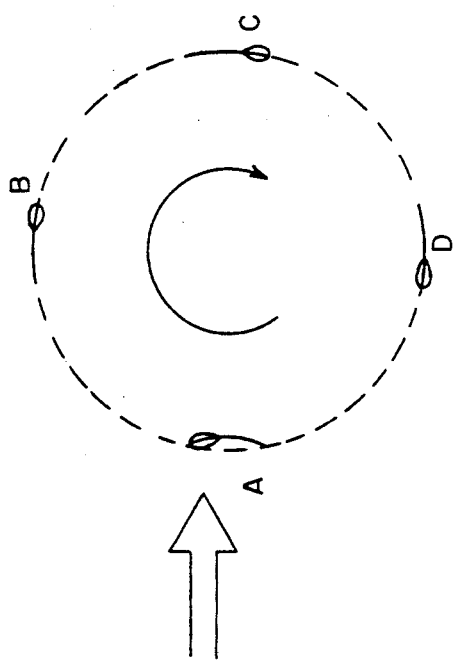
FIG. 16 is a schematic of a horizontal section of a sail rotor turbine as viewed from above, showing successive positions of a blade.

Under normal operation of the turbine, the sail blade changes camber with its position relative to the wind as indicated in the schematic diagram of a particular section in FIG. 16. At position A, the blade is in the up-wind position and experiences a positive angle of attack. The aerodynamic pressure, associated with that angle of attack, dominates over the centrifugal pressure, contributed by the surface density of the membrane 212, and the sections are cambered inwardly toward the axis of the rotor. This camber provides more lift and better aerodynamic efficiency than an uncambered blade. As the blade rotates toward position B, the aerodynamic pressure declines to zero. Here the centrifugal pressure acting on the membrane tends to arch the section into the curvature of its path around the axis. Moving toward the up-wind position, the angle of attack takes on negative values and the aerodynamic pressure combines with the centrifugal pressure to camber the section outward away from the axis. This negative camber has the same beneficial effect on the aerodynamic efficiency at negative angles of attack as the positive camber had for positive angles. Moving from C to D the angle of attack reduces to zero and the section membrane is arched into the circular path. Moving from D to A, the angle of attack once again becomes positive and the section cambers inwardly.

As the wind speed changes, the control system changes the amount of blade deployed to optimize the energy capture. If the wind speed increases beyond that for which the system is designed, the blades can be retracted to restrict power to the design load until such time as the wind moderates.

To retract the blades, the hub control motor 187 is actuated in the direction to reel in the blade leading edge strength member 214 and trailing edge strength member 218 and restore the flyweights to their cradles 170 along the course indicated by the dashed arrows of FIG. 1 by reversing the procedure for deployment. In the event of a failure of the load, such as may happen when the electrical connections between the output cables 152 and the network are broken, the turbine will accelerate and tend to overspeed. To prevent overspeed from occurring the brake 147/148 is engaged to replace the electrical load and the retraction procedure followed to stop the turbine.

Considering the operation of the second preferred embodiment, when the turbine 300 of this embodiment is idle, it is in the same state as described above for the idle condition and the blades are in the furled state indicated by the dashed lines 330F in FIG. 8. In this state, the upper control hub 324 will be in its highest position on the spindle shaft 320S. To start the turbine, the remote controls are used to energize the generator/motor 349, but for this embodiment, the motor drives the secondary turbine 343 in the sense opposite to that in which it rotates as a turbine. This reversed operation will cause the secondary turbines to operate as propellers and they will produce thrust urging the active flyweight assemblies forward and carrying the primary blade assemblies with them causing the spindle shaft 320S to rotate in its bearings. The centrifugal forces resulting from the rotation of the active flyweight assemblies 340 will tense the leading and trailing edge strength members 332 and 334 tending to deploy the blades, but these blades will be restrained by the blade control cables 328. By actuating the cable control system, the sliding control hub 324 will be permitted to descend, in a controlled fashion, along the splines 322 on the spindle shaft 320S thus permitting the blades to deploy. As the rotational speed of the primary turbine increases under the urging of the propeller action of the secondary turbines 343, energy from the wind will be captured and torque provided to further accelerate the blades, thereby reducing the thrust required of the propeller action of the secondary turbine 343. As this acceleration takes place, the excitation of the generator/motor 349 will be modulated and the motor speed brought to zero and then permitted to accelerate as power is extracted from the wind by the primary turbine blades.

As in the above embodiment, the overall control system will control the extent of deployment so as to capture the optimum amount of energy. As the wind speed increases above the rated wind speed, the control system will contract the rotor so as to avoid overloading the system components. In order to return the turbine to the idle or standby state, the blades are furled by raising the sliding control hub 324 under control of the cable control system. As the primary turbine reaches the speed at which it no longer produces torque, the secondary turbines can again be engaged as propellers or as aerodynamic brakes by adjusting their rotational speeds and the direction of rotation in a procedure essentially the reverse of the starting procedure described above.

In the event of loss of load, there is the possibility of both the primary and the secondary turbines overspeeding. Again brakes 348 are provided to absorb the energy of the secondary turbines and to prevent such overspeeding. The primary turbine will have no tendency to overspeed if the secondary turbines are braked and the normal furling procedures as described above would be employed to stop the rotor. As the rotational speed decreases to the point where no energy is being absorbed by the primary turbine, the brakes can be gradually released and the secondary turbines used to control the final phase of furling.

Figure 15A:
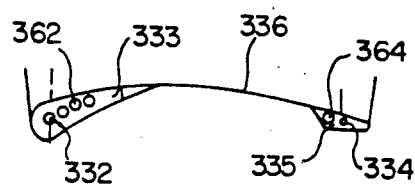
FIG. 15A is a sectional view of the lower blade panel taken along line 8—8 in FIG. 15.
Figure 19:
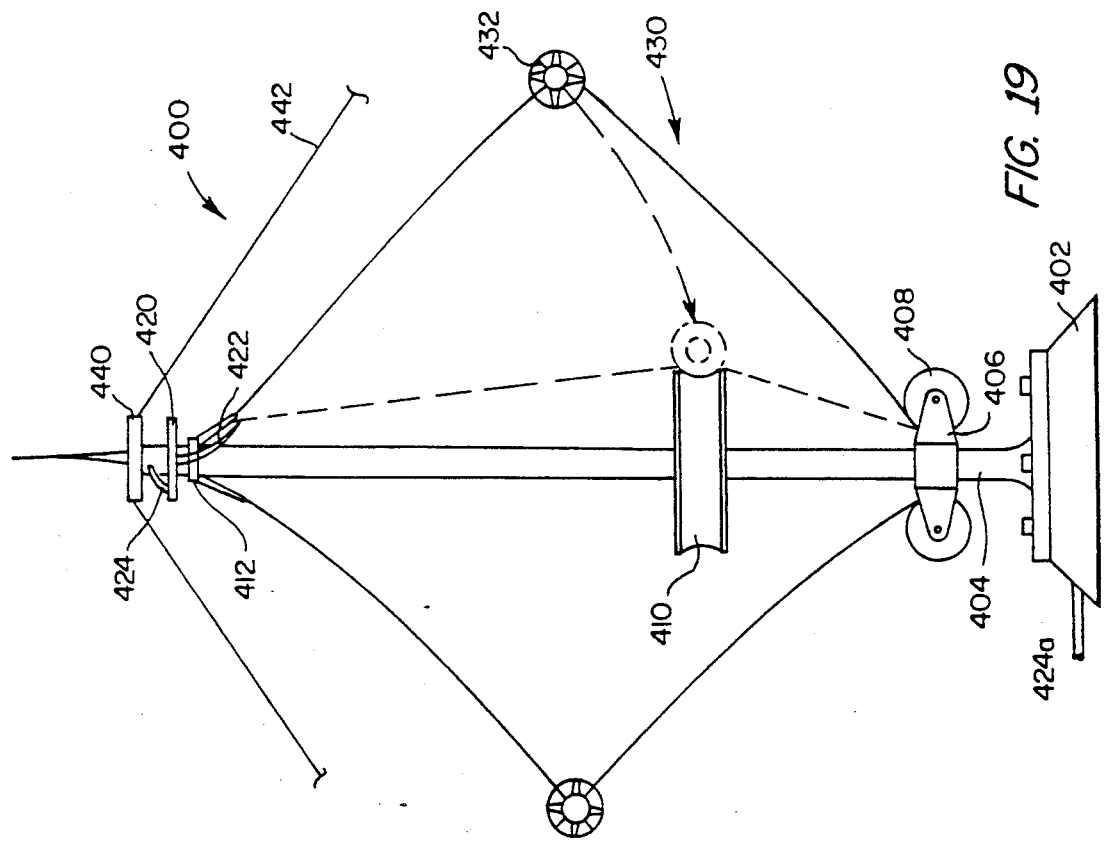
FIG. 19 is a front-elevational view of a vertical axis turbine in accordance with a third embodiment of the invention.

A third preferred embodiment of the invention is shown in FIG. 19. In this embodiment, the wind-turbine, which is generally denoted as 400, is broadly similar to the second embodiment described above in connection with FIG. 8, and other related figures, in that both embodiments employ secondary turbines to absorb the power of the primary turbine. In particular, the blade assembly of this embodiment, which is denoted 430, is similar to the blade assembly 330 of FIG. 15.

In the embodiment of FIG. 19, a base 402 supports a stationary, non-rotating mast or shaft 404. A lower hub 406 is positioned on the mast 404 by a thrust bearing (not shown) which allows the lower hub 406 to rotate freely about the mast 404. Hub reels 408 are supported by the lower hub 406. A circular cradle 410, capable of receiving active flyweights 432 at all positions around the shaft, is attached to the stationary shaft 404. An upper hub 412 is positioned on the mast or shaft 404 by a thrust bearing (not shown) which allows hub 412 to rotate freely. A slip-ring assembly 420 is attached to the shaft 404 above the upper hub 412. Rotating output cables 422 are attached to the input brushes of the slip-ring assembly 420 and stationary output cables 424 are attached to the output brushes of the slip ring assembly 420 and led through the hollow shaft 404 to the base where cables, which are denoted 424a at the base, can there be connected to the load. Guy wires 442 are attached to the shaft 404 through attachment ring 440.

The operation of this third preferred embodiment of the invention is in all ways the same as the operation of the second preferred embodiment previously described.

It will be appreciated from the foregoing that the invention provides for an extensive family of inexpensive and efficient wind turbines.

While the above description contains many specific details, these should not be construed as limitations on the scope of the invention, but rather as exemplifications of preferred embodiments. Many other variations are possible. For example, the above description of the invention has been illustrated as applied to the generation of electricity. The invention can be applied other intermittent power uses, such as pumping water, compressing air, direct heating, electrolysis of water and the other uses of energy. In these alternative uses, a means must be available for starting the turbine, since the turbine is not self starting. Furthermore, although the description has been restricted to vertical wind turbines, the invention could as well be applied to transverse turbines in other fluids such as water, oil, etc. Further, the invention has been described in connection with two and three bladed turbines. Machines with other numbers of blades are equally valid. Accordingly, the scope of the invention should be determined not by the exemplary embodiments illustrated but rather by the appended claims.

| NUMERIC SORT | | ALPHABETIC SORT | |
|---|---|---|---|
| FIRST PREFERRED EMBODIMENT 100 | | | |
| 120 | BASE | BASE | 120 |
| 140 | SPEED INCREASER ASSEMBLY | BLADE ASSEMBLY | 200 |
| 141 | STUB SHAFT | BRACKET | 188 |
| 142a | UPPER BEARING ASSEMBLY | BRAKE CALIPER | 148 |
| 142b | LOWER BEARING ASSEMBLY | BRAKE DISK | 147 |
| 143 | HOUSING | BULL GEAR | 144 |
| 144 | BULL GEAR | CONTROL HUB ASSEMBLY | 180 |
| 145 | PINION | CRADLE | 170 |
| 146 | HIGH SPEED SHAFT | DRIVE SHAFT | 162 |
| 147 | BRAKE DISK | ELECTRICAL OUTPUT CABLE | 152 |
| 148 | BRAKE CALIPER | FINS | 225 |
| 150 | GENERATOR/MOTOR | FIXED HUB | 181 |
| 152 | ELECTRICAL OUTPUT CABLE | FLYWEIGHT | 220 |
| 162 | DRIVE SHAFT | FURLED BLADE | 200F |
| 164 | UPPER BEARING SUPPORT | GENERATOR/MOTOR | 150 |
| 166 | GUY | GROOVED DRUM | 185 |
| 170 | CRADLE | GUIDE ROLLER | 182 |
| 180 | CONTROL HUB ASSEMBLY | GUY | 166 |
| 181 | FIXED HUB | HIGH SPEED SHAFT | 146 |
| 182 | GUIDE ROLLER | HOUSING | 143 |
| 184 | HUB REEL | HUB REEL | 184 |
| 185 | GROOVED DRUM | LEADING EDGE FAIRING | 216 |

| NUMERIC SORT | | ALPHABETIC SORT | |
|---|---|---|---|
| 186 | SYNCHRONIZING SHAFT | LEADING EDGE STRENGTH MEMBER | 214 |
| 187 | REEL MOTOR | LOWER BEARING ASSEMBLY | 142b |
| 188 | BRACKET | MEMBRANE | 212 |
| 189 | SHAFT | PANEL ASSEMBLY | 210 |
| 190 | UNIVERSAL JOINT | PINION | 145 |
| 200 | BLADE ASSEMBLY | REEL MOTOR | 187 |
| 200F | FURLED BLADE | SHAFT | 189 |
| 210 | PANEL ASSEMBLY | SPEED INCREASER ASSEMBLY | 140 |
| 212 | MEMBRANE | STUB SHAFT | 141 |
| 214 | LEADING EDGE STRENGTH MEMBER | SYNCHRONIZING SHAFT | 186 |
| 216 | LEADING EDGE FAIRING | TRAILING EDGE FAIRING | 219 |
| 218 | TRAILING EDGE STRENGTH MEMBER | TRAILING EDGE STRENGTH MEMBER | 218 |
| 219 | TRAILING EDGE FAIRING | UNCLOTHED | U |
| 220 | FLYWEIGHT | UNIVERSAL JOINT | 190 |
| 225 | FINS | UPPER BEARING ASSEMBLY | 142a |
| U | UNCLOTHED | UPPER BEARING SUPPORT | 164 |
| SECOND PREFERRED EMBODIMENT 300 | | | |
| 302 | ANTENNA | ACTIVE FLYWEIGHT ASSEMBLY | 340 |
| 304 | UPPER BEARING SUPPORT | AERODYNAMIC FAIRING | 350 |
| 306 | GUYS | AFT SPIDER | 342A |
| 308 | FLYWEIGHT CRADLE | AFTERBODY | 351 |
| 310 | LOWER SUPPORT ASSEMBLY | ANTENNA | 302 |
| 311 | BASE | BASE | 311 |
| 312 | STUB SHAFT | BLADE ASSEMBLY | 330 |
| 313 | HOUSING | BLADE ATTACHMENT EARS | 315 |
| 315 | BLADE ATTACHMENT EARS | BRAKE | 348 |
| 320 | SPINDLE SHAFT | CONTROL CABLE | 328 |
| 322 | SHAFT SPLINE | COWLING | 341 |
| 324 | SLIDING HUB | ELECTRICAL GENERATOR/MOTOR | 349 |
| 324F | SLIDING HUB AT FURL POSITION | FLYWEIGHT CRADLE | 308 |
| 326 | UPPER ATTACHMENT EARS | FOREWARD SPIDER | 342F |
| 328 | CONTROL CABLE | FURLED BLADE ASSEMBLY | 338F |
| 329 | PULLEY | GEARBOX (SPEED INCREASER) | 345 |
| 330 | BLADE ASSEMBLY | GUYS | 306 |
| 330F | FURLED BLADE ASSEMBLY | HIGH SPEED COUPLING | 346 |
| 331L | LOWER SAIL PANEL | HIGH SPEED SHAFT | 347 |
| 331U | UPPER SAIL PANEL | HOUSING | 313 |
| 332 | LEADING EDGE STRENGTH MEMBER | LEADING EDGE FAIRING | 333 |
| 333 | LEADING EDGE FAIRING | LEADING EDGE STRENGTH MEMBER | 332 |
| 334 | TRAILING EDGE STRENGTH MEMBER | LOWER SAIL PANEL | 331L |
| 335 | TRAILING EDGE FAIRING | LOWER SUPPORT ASSEMBLY | 310 |
| 336 | SAIL MEMBRANE | PULLEY | 329 |
| 340 | ACTIVE FLYWEIGHT ASSEMBLY | ROTATING ELECT. GROUND CABLE | 364 |
| 341 | COWLING | ROTATING ELECT. OUTPUT CABLE | 362 |
| 342A | AFT SPIDER | SAIL MEMBRANE | 336 |
| 342F | FOREWARD SPIDER | SECONDARY TURBINE | 343 |
| 343 | SECONDARY TURBINE | SHAFT SPLINE | 322 |
| 345 | GEARBOX (SPEED INCREASER) | SLIDING HUB | 324 |
| 346 | HIGH SPEED COUPLING | SLIDING HUB AT FURL POSITION | 324F |
| 347 | HIGH SPEED SHAFT | SLIP RING ASSEMBLY | 366 |
| 348 | BRAKE | SLIP RING ASSEMBLY | 366 |
| 349 | ELECTRICAL GENERATOR/MOTOR | SPINDLE SHAFT | 320 |
| 350 | AERODYNAMIC FAIRING | STATIONARY ELE. OUTPUT CABLE | 368 |
| 351 | AFTERBODY | STUB SHAFT | 312 |
| 362 | ROTATING ELECT. OUTPUT CABLE | TRAILING EDGE FAIRING | 335 |
| 364 | ROTATING ELECT. GROUND CABLE | TRAILING EDGE STRENGTH MEMBER | 334 |
| 366 | SLIPRING ASSEMBLY | UPPER ATTACHMENT EARS | 326 |
| 366 | SLIP RING ASSEMBLY | UPPER BEARING SUPPORT | 304 |
| 368 | STATIONARY ELE. OUTPUT CABLE | UPPER MAST ASSEMBLY | 370 |
| 370 | UPPER MAST ASSEMBLY | UPPER SAIL PANEL | 331U |

What is claimed is:

1. In a vertical axis turbine comprising a vertically extending, rotatable shaft; upper and lower blade attachment means for attaching at least one blade to said shaft, and a power absorbing load device coupled to said shaft; the improvement wherein said at least one blade comprises a flexible sail blade, made of fabric or film so as to have no substantial resistance to bending and thus to be limp under no load, and so that in operation, said blade cambers inwardly towards the axis of rotation of the shaft when the blade is in an upwind position and cambers outwardly away from said axis of rotation when the blade is in a downwind position, and attached at the ends thereof to said shaft by said upper and lower blade attachment means and deployed and stabilized in operation by the centrifugal forces produced in response to rotation of said blades about the vertical axis of said shaft, whereby, in operation, aerodynamic forces acting on said sail blades can be transmitted to shaft without generating bending moments, said blade having at least one flyweight secured thereto.

2. A vertical axis turbine as claimed in claim 1 wherein said at least one sail blade comprises at least two flexible elongate sail panels arranged in end to end relation, said at least one flyweight being disposed between and secured to adjacent ends of said two sail panels.

3. A vertical axis turbine as claimed in claim 2 wherein said at least one sail blade comprises a first sail panel connected at one end thereof to said lower attachment means and at the other end thereof to a second said flyweight, and a third panel connected at one end thereof to the first flyweight and at the other end thereof to a second said flyweight, and a third panel connected at one end thereof to the second flyweight and at the other end thereof to said upper attachment means.

4. A vertical axis turbine as claimed in claim 2 wherein said flyweights comprise passive weights.

5. A vertical axis turbine as claimed in claim 1 wherein one of said upper or lower blade attachment means comprises an attachment member mounted on said vertical shaft for movement therealong and means for providing movement of said attachment member along the shaft from a first position wherein the sail blade is furled and at least one further position wherein the sail blades is at least partially deployed.

6. A vertical axis turbine as claimed in claim 5 wherein said attachment member comprises an attachment hub mounted in surrounding relation to said shaft and including sockets which engage in corresponding splines in said shaft.

7. A vertical axis turbine as claimed in claim 1 wherein said at least one blade includes a leading edge and a trailing edge, said at least one blade comprising a leading edge strength member extending along and secured to the leading edge of the blade and a trailing edge strength member extending along and secured to the trailing edge of the blade.

8. A fluid activated turbine for extracting energy from a fluid acting thereon, said turbine comprising:
   a shaft;
   a plurality of flexible said blades supported by said shaft and rotatable about an axis of rotation in response to fluid acting thereon, each sail blade being fabricated of a fabric or film having no substantial resistance to bending so as to be limp under no load, and such that, in operation, said sail blade cambers inwardly towards said axis of rotation when the blade is in a rotational position towards the direction of the fluid force acting thereon and cambers outwardly away from said axis of rotation when the blade is in a rotational position away from the direction of the fluid force acting thereon and including at least one flyweight secured thereto intermediate the ends of said blade; and
   energy extracting means responsive to rotation of said sail blades for extracting energy from action of said fluid.

9. A fluid activated turbine as claimed in claim 8 wherein said shaft is stationary, wherein said turbine further comprises means for mounting said blades on said shaft for rotation about said shaft, and wherein said energy extracting means is incorporated in said flyweight.

10. A fluid activated turbine as claimed in claim 8 wherein said shaft is rotatable, wherein said turbine further comprises means for mounting said blades on said shaft for rotation therewith, and wherein said energy extracting means is responsive to rotation of said shaft.

11. A fluid activated turbine as claimed in claim 8 wherein said flexible sail blades each comprise at least two flexible elongate sail panels arranged in end to end relationship and said flyweight is disposed between and secured to adjacent ends of said sail panels.

12. A fluid actuated turbine as claimed in claim 8, wherein each of said blades includes a leading edge and a trailing edge and each of said blades comprises a leading edge strength member extending along and secured to the leading edge of the blade and a trailing edge strength member extending along and secured tot he trailing edge of the blade.

13. In a vertical axis turbine comprising a vertically extending, rotatable shaft; upper and lower blade attachment means for attaching at least one blade to said shaft, and a power absorbing load device coupled to said shaft; the improvement wherein said at least one blade comprises a flexible sail blase, made of fabric or film so as to have no substantial resistance to bending and thus to be limp under no load, said blade being attached at the ends thereof to said shaft by said upper and lower blade attachment means and being deployed and stabilized in operation by the centrifugal forces produced in response to rotation of said blades about the vertical axis of said shaft, whereby, in operation, aerodynamic forces acting on said sail blades can be transmitted to shaft without generating bending moments and the shape of the sail blades in profile is determined by the aerodynamic and centrifugal forces acting thereon, said blade having at least one flyweight secured thereto.

* * * * *